May 22, 1951 — L. OSTRANDER — 2,553,980
SEINING NET
Filed April 27, 1950
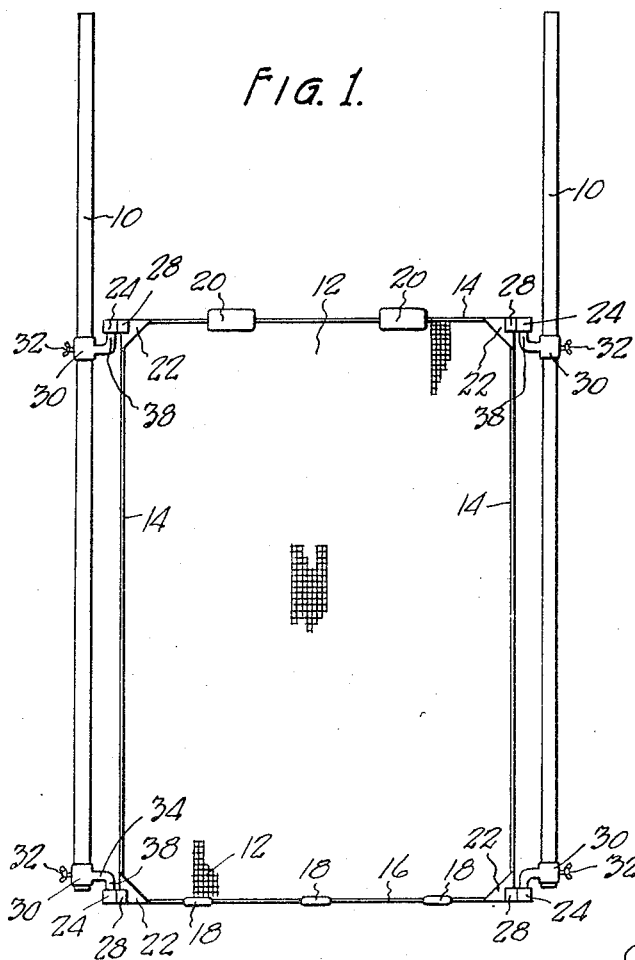
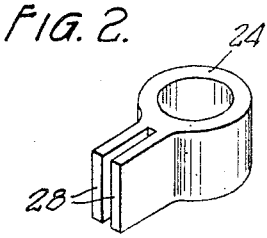
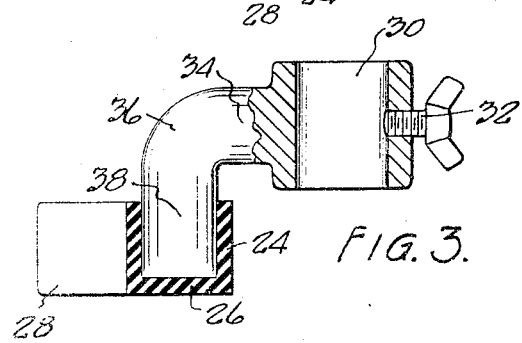
INVENTOR.
LOWELL OSTRANDER.
BY Oltsch & Knobloch
ATTORNEYS.

Patented May 22, 1951

2,553,980

UNITED STATES PATENT OFFICE 2,553,980

SEINING NET

Lowell Ostrander, Turkey Creek Township, Kosciusko County, Ind., assignor of one-half to Robert Franks, Wawaka, Ind.

Application April 27, 1950, Serial No. 158,560

7 Claims. (Cl. 43—14)

This invention relates to improvements in seining nets.

The primary object of the invention is to provide a novel and simple construction of seining net by means of which the parts may be assembled in effective and desired relationship, may easily be disassembled, and which is convenient for use.

A further object is to provide a construction wherein a pair of handle members mount opposite sides of a net and means are provided for anchoring the net to the handle members in a position to hold the net taut lengthwise of the handle and to prevent slippage or release of the net from the handle.

A further object of the invention is to provide a seining net so constructed that the net may be positioned as desired with an edge along the bottom of the stream so that minnows or other small fish to be seined cannot swim below the bottom of the net and escape the seiner.

Other objects will be apparent from the following specification.

In the drawing:

Fig. 1 is a view of the device in assembled position.

Fig. 2 is an enlarged perspective view of a socket member carried by the net; and Fig. 3 is an enlarged detail assembly view illustrating the construction and relation between the net carried socket and a pole or rod carried fixture.

Referring to the drawing which illustrates the preferred embodiment of the invention, the numeral 10 designates an elongated handle. Two of these handles are employed, preferably of substantially the same length and breadth, and each of which preferably is circular in cross-section. The handle 10 will be of a length sufficient to carry a net 12 of the size desired at one end thereof, leaving a portion projecting beyond said net which the user can grasp to hold at his sides during use in the manner well understood in the art. The seining net 12 may be of any construction found suitable and preferably has a cord or rope 14 secured thereto and extending continuously around its margin. The net preferably will be of substantially rectangular shape as illustrated, and the run 16 of the cord at the end which is to form the bottom or outer end of the net has mounted thereon in any suitable manner one or more weight elements 18. These weight members are preferably of elongated cylindrical outline as illustrated, and extend lengthwise along the cord portion 16 with their lateral projection relative to said cord quite limited in extent. One method of anchoring such weights to the cord would be to form the weights of a soft metal and provide them with a longitudinal groove fitting around the cord and then crimp the jaws at the opposite sides of the groove to grip the cord. At the opposite or upper end of the seining net may be mounted one or more buoyant members 20, such as cork members, which tend to hold that end of the net up in the water during use or at a time when the net would accidentally be dropped in the water.

Each of the corners of the net assembly is preferably reinforced and strengthened by sewing, stapling or otherwise anchoring thereto sturdy sheet material which may comprise cloth, rubber, metal or the like. These corner reinforcing members 22 may be of single or multiple thickness, that is, may extend along one surface of the net only or along the opposite surfaces to grip the net therebetween. Each of these corner pieces has secured thereto a socket member of the character best illustrated in Fig. 2. This socket member is preferably formed of material such as rubber, synthetic rubber or plastic, although it may be formed of wood or metal or other material. The socket member is of generally cupped shape having a cylindrical or tubular wall portion 24 and an end wall portion 26. A pair of close spaced, similar, substantially parallel tabs 28 project outwardly and substantially radially from the cylindrical portion 24 and are adapted to receive therebetween the net corner reinforcing portions 22. Staples, bolts, stitching or other suitable securing means may be employed to anchor the socket tabs 28 to the net corner reinforcements 22. As best seen in Fig. 1, the tabs 28 are located substantially at the corner of the net unit so that the axis of the socket member is positioned to extend lengthwise of the net in outwardly spaced relation to the net. The socket members at opposite ends of the same side of the net face each other, that is, the open ends of the sockets are positioned inwardly thereof.

Each of the poles mounts a pair of brackets or fixtures of the character best illustrated in Fig. 3 and formed of metal, plastic or other rigid material. Each fixture has a tubular or sleevelike portion 30 adapted for snug but sliding fit upon one of the handles, rods or poles 10. A set screw 32 is threaded in each sleeve 30 and is adapted to be tightened for the purpose of anchoring the sleeve in selected fixed position upon the pole handle in the manner well understood in the art. A rod portion 34 projects radially laterally from the sleeve portion 30 to a point clear of said sleeve and is bent at substantially right angles at 36 to provide a terminal or stud portion 38 cooperating with the rod portion 34 to form an L-shaped portion projecting from the sleeve. The stud or terminal portion 38 has its axis substantially parallel to the axis of the sleeve 30, is laterally spaced therefrom and projects longitudinally a substantial distance beyond one end of the sleeve portion 30, all as well illustrated in Fig. 3. The stud or terminal portion 38 will be of a size and shape to have a snug fit within the socket portion 24. In this connection, while the parts 28 and 34 are shown as being of circular cross-section, it will be evident that such cross-sectional shape is illustrative, and said parts may have any cross-sectional configuration desired.

In the assembly of the net, the tubular part 30 of a fixture is mounted upon one end of each of two poles 10, and preferably is so located with reference to the length of that pole that the stud or terminal portion 38 of the fixture will project beyond the end of the pole 10. Each of these fixtures is clamped or secured at the selected position as by means of the set screw 32. It will be understood, however, that other means than the set screw may be employed if desired. A second fixture is then mounted upon each rod or pole 10 with its terminal stud projecting therefrom in a direction opposite that in which the stud of the first named end fixture projects. The net is then applied to the handle by fitting one socket over the stud of the fixed outer end fixture, and the other socket at the same side of the net upon the other fixture upon the same rod. This latter fixture then is slid in a direction to tension the portion of the net adjacent thereto whereupon the fixture is secured in place. The same operation is then performed to secure the opposite side of the net to the other pole. The net thus is secured effectively to each of the two poles, serves as a flexible means to connect the poles together, and is drawn taut longitudinally at its sides adjacent the handle members at all times. This prevents release of the net from the handles and holds the net in such a manner that it is simple to use.

It will be apparent that by the provision of the weights 18 at the outer or lower end of the net and the projection of the cord run 16 longitudinally beyond the ends of the handles or poles 10, the seiner can easily follow the contour of the bottom of the stream or other body of water when attempting to seine minnows or other small fish. By this construction it is possible, by holding the handles to fairly stretch the net at its lower end in a transverse or lateral direction, to control the position of the cord 16, and this is accomplished without interference from the ends of the poles. The cord run 16 is free to touch the bottom except as prevented from doing so because of the character of the weights. Consequently, the user is enabled to quickly and simply seine minnows and to position his net in a manner which will reduce the possibilities of the minnows escaping capture.

While the preferred embodiment of the invention is illustrated and described herein, it will be understood that changes may be made in the construction within the scope of the appended claims without departing from the spirit of the invention.

I claim:

1. In a seining net, a pair of elongated handles, a pair of spaced fixtures carried by each handle, each fixture having a terminal portion spaced from and substantially parallel to said handle, the terminal portions of the fixtures on each handle extending in opposite directions, a net, and a plurality of socket members carried by said net, each of said socket members fitting upon one of said fixture terminal portions.

2. In a seining net, a pair of elongated handles, a pair of spaced fixtures carried by each handle, each fixture having a terminal portion spaced from and substantially parallel to said handle, the terminal portions of the fixtures on each handle extending in opposite directions, a net, and a plurality of socket members carried by said net, each of said socket members fitting upon one of said fixture terminal portions, each fixture constituting a sleeve encircling a handle, a member locking said sleeve in fixed position on the handle, and an L-shaped portion projecting radially from said sleeve and including said terminal portion.

3. In a seining net, a pair of elongated handles, a pair of spaced fixtures carried by each handle, each fixture having a terminal portion spaced from and substantially parallel to said handle, the terminal portions of the fixtures on each handle extending in opposite directions, a net, and a plurality of socket members carried by said net, each of said socket members fitting upon one of said fixture terminal portions, each socket member including a cup-shaped part and a substantially radially and laterally projecting integral anchoring tab.

4. In a seining net, a pair of elongated handles, a fixture mounted on the outer end of each handle and having a longitudinal outwardly projecting stud portion, a second fixture mounted on each handle and having a longitudinally inwardly projecting stud portion, means for anchoring said fixtures in selected position on said handles, a net, and a plurality of sockets carried by said net and fitting upon said studs, the fixtures upon each handle being spaced apart to hold said net taut in a direction lengthwise of said handles.

5. In a seining net, a pair of elongated handles, a fixture mounted on the outer end of each handle and having a longitudinal outwardly projecting stud portion, a second fixture mounted on each handle and having a longitudinally inwardly projecting stud portion, means for anchoring said fixtures in selected position on said handles, a net, and a plurality of sockets carried by said net and fitting upon said studs, the fixtures upon each handle being spaced apart to hold said net taut in a direction lengthwise of said handles, the stud portions of said outer fixtures extending beyond the outer ends of said handles to position said net projecting longitudinally beyond the handle ends.

6. In a seining net, a pair of elongated handles, a fixture mounted on the outer end of each handle and having a longitudinal outwardly projecting stud portion, a second fixture mounted on each handle and having a longitudinally inwardly projecting stud portion, means for anchoring said fixtures in selected position on said handles, a net, and a plurality of sockets carried by said net and fitting upon said studs, the fixtures upon each handle being spaced apart to hold said net taut in a direction lengthwise of said handles, each net including a marginally anchored cord and corner pieces formed of sheet material anchored to said cord, said socket members being anchored to and projecting from said corner pieces.

7. In a seining net, a pair of elongated handles, a fixture mounted on the outer end of each handle and having a longitudinal outwardly projecting stud portion, a second fixture mounted on each handle and having a longitudinally inwardly projecting stud portion, means for anchoring said fixtures in selected position on said handles, a net, and a plurality of sockets carried by said net and fitting upon said studs, the fixtures upon each handle being spaced apart to hold said net taut in a direction lengthwise of said handles, each net including a marginally anchored cord and corner pieces formed of sheet material anchored to said cord, each socket member including a pair of integral spaced confronting laterally projecting tabs receiving the corner portions of said net therebetween and fixedly secured thereto.

LOWELL OSTRANDER.

REFERENCES CITED

The following references are of record in the file of this patent:

UNITED STATES PATENTS

| Number | Name | Date |
|---|---|---|
| 483,466 | Moore | Sept. 27, 1892 |
| 758,482 | Smith | Apr. 26, 1904 |
| 1,429,446 | Morgan | Sept. 19, 1922 |
| 1,539,708 | Whitford | May 26, 1925 |
| 1,671,812 | Chase | May 29, 1928 |
| 2,203,827 | Kors | June 11, 1940 |